United States Patent [19]

Hori

[11] Patent Number: 4,608,577

[45] Date of Patent: Aug. 26, 1986

[54] INK-BELT BUBBLE PROPULSION PRINTER

[75] Inventor: Kenichi Hori, Tokyo, Japan

[73] Assignee: Elm Co., Ltd., Tokyo, Japan

[21] Appl. No.: 653,870

[22] Filed: Sep. 21, 1984

[30] Foreign Application Priority Data

Sep. 28, 1983 [JP] Japan ................................ 58-178201

[51] Int. Cl.[4] ........................ G01D 15/16; G01D 15/10

[52] U.S. Cl. .................................. 346/140 R; 346/46; 346/76 PH

[58] Field of Search ................ 346/75, 140 R, 76 PH, 346/46

[56] References Cited

U.S. PATENT DOCUMENTS

| | | | |
|---|---|---|---|
| 3,747,120 | 7/1973 | Stemme | 346/75 X |
| 4,263,601 | 4/1981 | Nishimura et al. | 346/1.1 X |
| 4,308,547 | 12/1981 | Lovelady et al. | 346/140 R |
| 4,312,009 | 1/1982 | Lange | 346/140 R |
| 4,337,467 | 6/1982 | Yano | 346/1.1 X |
| 4,366,487 | 12/1982 | Willett | 346/1.1 X |
| 4,515,487 | 5/1983 | Minami | 400/121 X |

*Primary Examiner*—E. A. Goldberg
*Assistant Examiner*—Gerald E. Preston
*Attorney, Agent, or Firm*—Cislo, O'Reilly & Thomas

[57] ABSTRACT

A printing machine is provided, comprising a thin film having first and second surfaces connected by a plurality of hole or recess portions and movably positioned; an ink tank for supplying ink to the hole or recess portions; a thermal head member having a plurality of thermal head elements in contact with the first surface of the film; a driving circuit for selectively driving the thermal head elements; and a recording paper feeding mechanism to feed recording paper adjacent the second surface of the film. The ink fills the holes or recess portions, and the thermal head element is selectively driven by the driving circuit when one thermal head element corresponds to a plurality of holes or recesses of the film, whereby ink is sprouted or jetted from a plurality of the holes or recesses onto the recording paper by bubble pressure caused by heat from the thermal head element. Color printing is also possible with the apparatus of the invention.

9 Claims, 16 Drawing Figures

INK-BELT BUBBLE PROPULSION PRINTER

BACKGROUND AND DESCRIPTION OF THE INVENTION

The present invention relates to a printing machine and particularly to an ink jet typed thermal printing machine without an ink stopped trouble.

In the conventional type, many kind of printing machine be developed from impact type to non-impact type, in said non-impact type, an electronic photograph system, electro-static system, thermal system and ink jet system etc. However, in said systems, said ink jet system is very silent, low power consumption and small type; however, a broad use of said ink jet system is not attained. A main reason of said non use of ink jet is based on a stopped condition of ink jet nozzle; therefore, a material of ink and nozzle shape are powerfully researched and developed, but, it is not sufficient to use ink jet system without any trouble, whereby a sufficient reliability is not obtained.

The present invention aims to eliminate the above noted difficulty and insufficiency and to provide a new ink jet printing machine by using a thermal head member.

A basic idea of the present invention is to use a new film having a plurality of hole or recess portions which be corresponded to conventional ink jet nozzle, a recording ink be filled into said hole or recess portions, said ink be sprouted on a paper by a bubble pressure of heat of thermal head member, whereby an ink jet stop is completely eliminated.

Figure 1A:
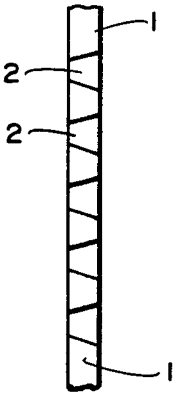
FIGS. 1*a* and 1*b* show a cross sectional and front view of the nozzle film.

Referring now to the embodiment of the present invention accompanying drawings in which;

FIGS. 1*a* and *b* show a cross sectional view and a front view of a film. Numeral 1 is a film of thin metal film or heat resistant organic film of polyimide, numeral 2 is a plurality of a hole or recess portions which be shaped in or on said film 1, a diameter of said hole or recess portions 2 are about 10–200 μm, said diameter is determined according to a thickness of said film or way of use.

Figure 2A:
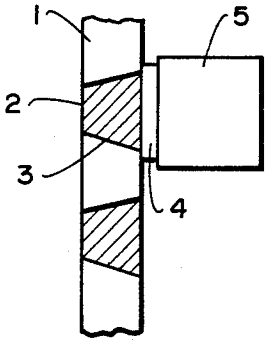
FIGS. 2*a*, 2*b*, and 2*c* depict the film/thermal element interface for ink bubble development.

FIGS. 2*a*, *b* and *c* show a basic principle of the present invention. A recording ink is filled into a plurality of a hole or recess portions 2 at an ink tank (later mentioned), said hole or recess portions 2 are moved on a surface of a thermal head member which having a plurality of thermal head elements 4 by moving said film 1. At this time, said thermal head element 4 is quickly heated by supplied electric current, whereby a bubble 6 is caused between said recording ink 3 and said thermal head element 4 of said thermal head member 5, a part or all of said recording ink in said hole or recess portions 2 be sprouted by pressure of said bubble 6.

Figure 1B:
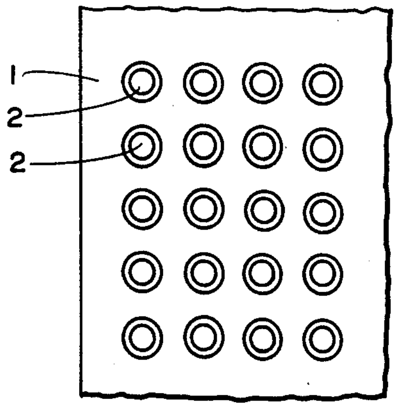
Figure 2B:
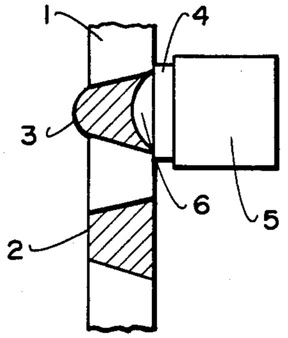
Figure 2C:
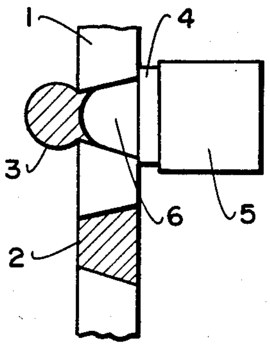
Figure 3A:
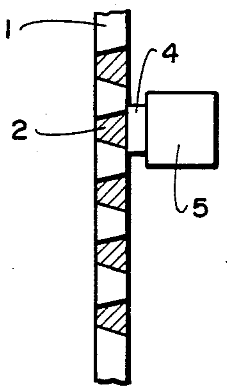
FIGS. 3*a* and 3*b* note film/thermal element correspondence.
Figure 3B:
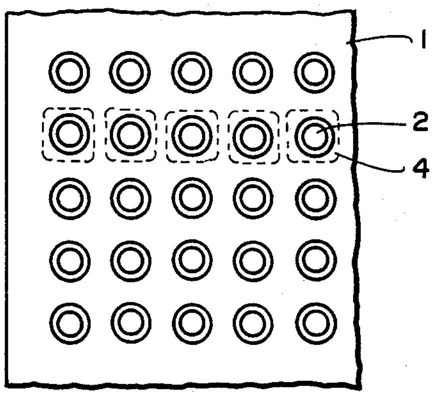

Said thermal head element 4 be shaped on a thermal head member 5, said film 1 and said thermal head element 4 be completely contacted therewith, said caused bubble 6 be only enlarged toward opened hole direction of said hole or recess portion 2, whereby a sprouted direction of said recording ink is precise in a certain direction. In the embodiments of FIGS. 1–3, one thermal head element 4 corresponded to one hole or recess portion 2 of said film 1 respectively.

Figure 4A:
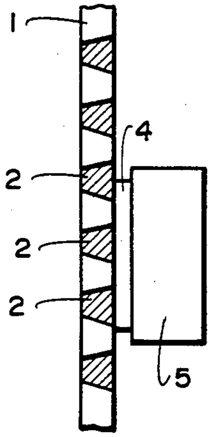
FIGS. 4*a* and 4*b* portray another film/thermal element arrangement.
Figure 4B:
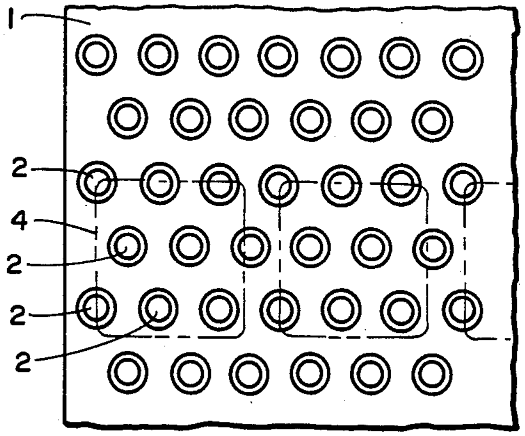

FIGS. 4*a* and 4*b* show another embodiment of the present invention; in this embodiment of FIGS. 4*a* and 4*b*, one thermal head element 4 be corresponds to a plurality of hole or recess portions 2. A construction of FIGS. 4*a* and 4*b* has a high reliability than the construction of FIGS. 1–3 from stand point of a stop of ink jet in a nozzle, whereby a mechanical construction for coinciding a location between said hole or recess portion 2 and thermal head element 4 is not necessary and becomes more simple construction. Namely any of said hole or recess portions 2 be definitely located on said thermal head element 4, a misrecording is completely eliminated.

Figure 5:
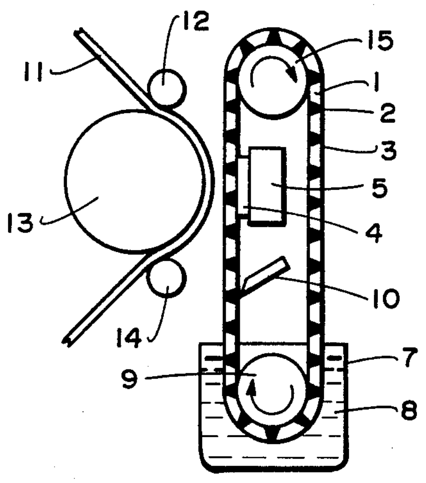
FIG. 5 shows a monochromic printer.

FIG. 5 shows a monocrome typed line printer, said film 1 is shaped in A4 or A3 typed width of endless type, a plurality of hole or recess portions 2 be shaped in or on said film 1. A diameter of said hole or recess portions 2 depends on said film thickness, for example, a maximum diameter is 50 μm in case of film thickness of 50 μm. Numeral 8 is a recording ink, numeral 7 is an ink tank. Said film 1 is rotatably supported by a pair of rollers 9 and 15 in an endless construction, said recording ink 8 be filled into said hole or recess portions 2 when said film 1 passes through in said ink tank 8 and transferred on a corresponded thermal head element 4 by said rollers 9 and 15 rotation. At this condition, a bubble (not shown) is caused between said thermal head element 4 and recording ink 8 by quickly heating said thermal head element by electric voltage application thereinto, said recording ink 8 be sprouted on a recording paper 11 from said hole or recess portion 2 as a nozzle by a bubble pressure, whereby a recording of character or image be recorded on said paper 11.

Numeral 5 is a thermal head member which having a plurality of thermal head elements 4 which be shaped in a length direction of said thermal head member 5 and has a driving circuit (not shown) which driving said thermal head elements 4, whereby a circuit construction becomes a simple one.

Said recording paper 11 which be located on a platen 13 is located against said hole or recess portion 2, said recording paper 11 is supported by a pair of rollers 12 and 14 which be attached on said platen 13. Numeral 10 is a blade to scrape off an unnecessary ink which be adhered to said film 1 after said film 1 passed through said ink tank 8. A printing to said recording paper 11 is performed by selectively applying an elctric voltage to said thermal head elements 4 by said driving circuit which be made of IC (not shown).

Figure 6:
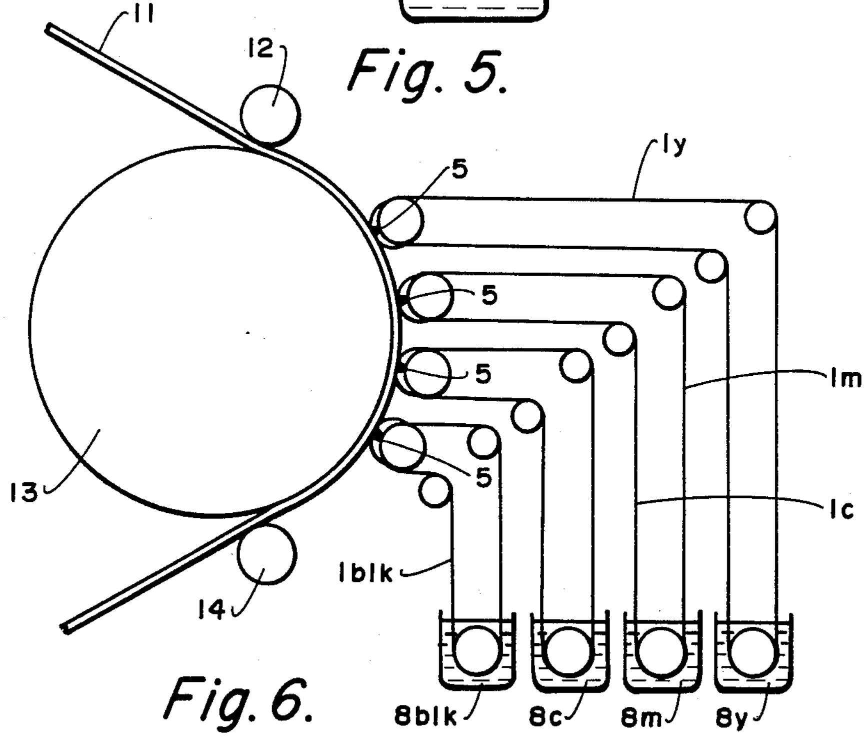
FIG. 6 depicts a polychromic printer.

FIG. 6 shows a construction for a color line printing function, a basic construction be composed of a plurality of mechanisms for each color sources which be basically equal to said monochrome mechanism in FIG. 5 respectively.

1*y* and 8*y* are a film and recording ink for Yellow color, 1*m* and 8*m* are a film and recording ink for Magenta color, 1*c* and 8*c* are a film and recording ink for Cyan color, 1*blk* and 8*blk* are a film and recording ink for black color. Said thermal head member 5 having a plulality of thermal head element 4 (not shown in FIG. 6) is located behind of said films 1*y*,1*m*,1*c* and 1*blk*. Said recording inks 8*y*,8*m*,8*c* and 8*blk* are selectively sprouted from said films iy,1*m*,1*c* and 1*blk* to said recording paper 11 by driving said thermal head elements 4 according to a timing signal from said driving circuit (not shown) during said recording paper 11 be feeded in a certain timing condition.

Figure 7:
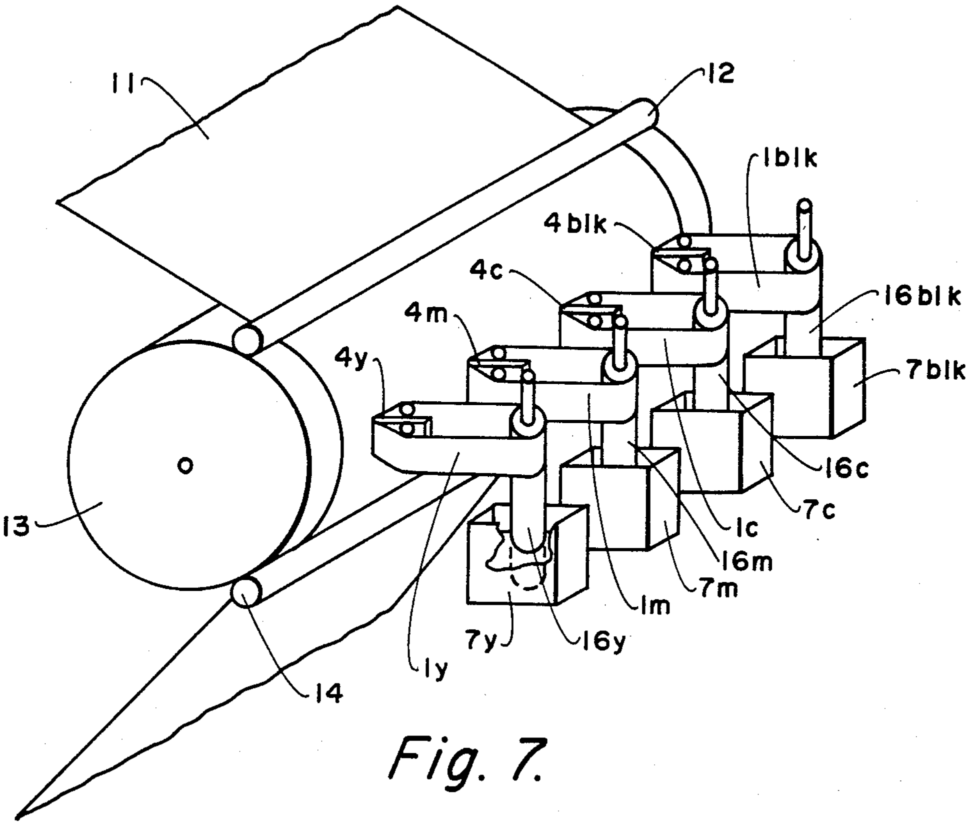
FIG. 7 depicts another polychromic printer.

FIG. 7 shows a construction of color serial printing machine. 1*y*,1*m*,1*c* and 1*blk* are the films of Yellow, Magenta, Cyan and Black colors, said films have a plurality of hole or recess portions 2 respectively. 4*y*,4*m*,4*c* and 4*blk* are the thermal head members for Yellow, Magenta, Cyan and Black colors, the thermal head elements of said thermal head members 4*y*,4*m*,4*c* and 4*blk* are aligned in the right of a length direction of said films 1*y*,1*m*,1*c* and 1*blk* respectively. 16*y*,16*m*,16*c* and 16*blk* are the ink supplying sponge rollers to supply the recording ink from the ink tanks 7*y*,7*m*,7*c* and 7*blk* to said films 1*y*–1*blk*. Said sponge 16*y*,16*m*,16*c* and 16*blk* suck up the recording ink from said ink tanks 7*y*–7*blk* and fill the recording ink to said hole or recess portions 2 which contact and pass the surfaces of said sponge rollers 16*y*,16*m*,16*c* and 16*blk*. Said films 1*y*,1*m*,1*c* and 1*blk*, said thermal head members 4*y*,4*m*,4*c* and 4*blk*, said sponge rollers 16*y*–16*blk* and said ink tanks 7*y*–7*blk* are compactly housed as one body (not shown) as a color recording head body, whereby it is able to attain a color serial print system by reciprocating said color recording head body according to a width of said recording paper 11.

Figures 8A, 8B, 8C, 8D:
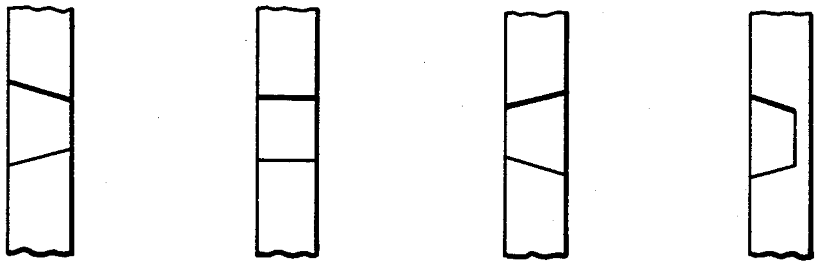
FIGS. 8*a*, 8*b*, 8*c*, and 8*d* reveal various cross-sectional shapes of the film-holes/recess.

FIG. 8 shows a cross sectional view of said hole or recess portions 2 of said film 1, a and b are the tapered portions, b is a parallel portion, d is a recess portions, A density of said hole or recess portions 2 in said film 1 is determined by a recording density and thermal head element density.

According to the present invention, it is able to obtain the monocrome and color line and serial printer.

It is able to completely eliminate a stop of ink jet or sprout by employing said hole or recess portions as the ink jet nozzles.

Further it is able to obtain a higher recording density than the conventional type because many holes and recesses are shaped in said film and are shaped in one thermal head element of said thermal head member.

A bubble pressure is employed to sprout said recording ink from said hole or recess portions to said recording paper, whereby a sprouting pressure is higher than a conventional piezo-electric element type.

In the embodiment of the present invention, said film is employed as an endless type; however, the present invention is not limited in this construction; it is able to employ another type of reciprocating said film.

Further, it is able to make said ink tank and film as a cassette type.

I claim:

1. A printing machine comprising in combination: a thin film having first and second surfaces connected by a plurality of hole or recess portions therein and movably positioned; an ink supplying means for supplying ink to said hole or recess portions; a thermal head member having a plurality of thermal head elements in contact with said first surface of said film; a driving circuit selectively driving said thermal head elements of said thermal head member; a recording paper feeding mechanism to feed recording paper adjacent said second surface of said film; said ink filling said hole or recess portions, said thermal head element being selectively driven by said driving circut when one thermal head element corresponds to a plurality of holes or recesses of said film, whereby said ink is sprouted from a plurality of holes or recesses of said film to said recording paper by bubble pressure caused by heat from said thermal head element.

2. A printing machine as claimed in claim 1, the length of said thermal head member, paper and film being substantially equal, whereby lines may be printed.

3. A printing machine as claimed in claim 1, said thermal elements being shaped to said thermal head member in accordance with the direction of paper feed, said film being fed substantially at right angles to the long direction of said thermal head member, whereby a serial printing function may be obtained.

4. A printing machine as claimed in claim 1, wherein a plurality of thermal head members, films, moving mechanisms and recording ink supplying means are provided for at least Yellow, Magneta and Cyan, respectively, whereby color printing may be obtained.

5. A printing machine as claimed in claim 1, wherein said film is flexible.

6. A printing machine comprising in combination: a flexible film of metal or organic material having a plurality of hole or recess portions of a diameter of 10 to 200 μm therein; a thermal head member having a plurality of thermal head elements; a recording ink tank for containing a recording ink; means for moving said film; a driving circuit for selectively energizing said thermal head elements; said recording ink filling said hole or recess portions by passing said film through said recording ink tank; said recording ink in said hole or recess portions being thermally sprouted to a paper surface by heating recording ink in predetermined hole or recess portions by a thermal head element when said hole or recess portion is adjacent said thermal head member surface, whereby a predetermined character or image may be printed on said paper.

7. A printing machine as claimed in claim 6, the length of said thermal head member, paper and film being substantially equal, whereby lines may be printed.

8. A printing machine as claimed in claim 6, said thermal element being shaped to said thermal head element in accordance with the direction of paper feed, said film being fed substantially at right angles to the long direction of said thermal head member, whereby a serial printing function may be obtained.

9. A printing machine as claimed in claim 6, wherein a plurality of thermal head members, films, moving mechanisms and recording ink tanks are provided for at least Yellow, Magenta and Cyan, respectively, whereby color printing maybe obtained.

* * * * *

UNITED STATES PATENT AND TRADEMARK OFFICE

CERTIFICATE OF CORRECTION

PATENT NO. : 4,608,577

DATED : August 26, 1986

INVENTOR(S) : Keiichi Hori

It is certified that error appears in the above-identified patent and that said Letters Patent is hereby corrected as shown below:

The inventor's name should be corrected to read:

Keiichi Hori

Signed and Sealed this

Thirteenth Day of January, 1987

*Attest:*

DONALD J. QUIGG

*Attesting Officer* *Commissioner of Patents and Trademarks*